(12) United States Patent
Gutierrez et al.

(10) Patent No.: US 10,359,788 B2
(45) Date of Patent: Jul. 23, 2019

(54) TWO-WIRE IRRIGATION COMMUNICATION SYSTEM

(71) Applicant: The Toro Company, Bloomington, MN (US)

(72) Inventors: Adrian Gutierrez, La Mirada, CA (US); Alex Korol, Diamond Bar, CA (US)

(73) Assignee: The Toro Company, Bloomington, MN (US)

( * ) Notice: Subject to any disclaimer, the term of this patent is extended or adjusted under 35 U.S.C. 154(b) by 253 days.

(21) Appl. No.: 15/333,031

(22) Filed: Oct. 24, 2016

(65) Prior Publication Data
US 2017/0115672 A1    Apr. 27, 2017

Related U.S. Application Data

(60) Provisional application No. 62/245,823, filed on Oct. 23, 2015.

(51) Int. Cl.
| | | |
|---|---|---|
| *G05D 7/06* | (2006.01) | |
| *H04B 3/54* | (2006.01) | |
| *A01G 25/16* | (2006.01) | |
| *G05B 19/042* | (2006.01) | |
| *H04L 29/08* | (2006.01) | |

(52) U.S. Cl.
CPC ......... *G05D 7/0676* (2013.01); *A01G 25/162* (2013.01); *G05B 19/042* (2013.01); *H04B 3/542* (2013.01); *G05B 2219/2625* (2013.01); *H04L 67/12* (2013.01)

(58) Field of Classification Search
CPC combination set(s) only.
See application file for complete search history.

(56) References Cited

U.S. PATENT DOCUMENTS

2005/0264973 A1 * 12/2005 Gardner ................ H04B 3/548
                                                           361/169.1
2010/0268392 A1 * 10/2010 Korol ................... G05D 7/0617
                                                           700/284

* cited by examiner

*Primary Examiner* — Ratisha Mehta
(74) *Attorney, Agent, or Firm* — Inskeep IP Group, Inc.

(57) ABSTRACT

A decoder for a two-wire irrigation system is disclosed, having the ability to be remotely updated with new firmware over the two-wire network, the ability to download irrigation commands that can be executed at a later time, the ability to adjust its data speed when data corruption is encountered, and the ability to sense the position of an attached solenoid plunger.

16 Claims, 10 Drawing Sheets

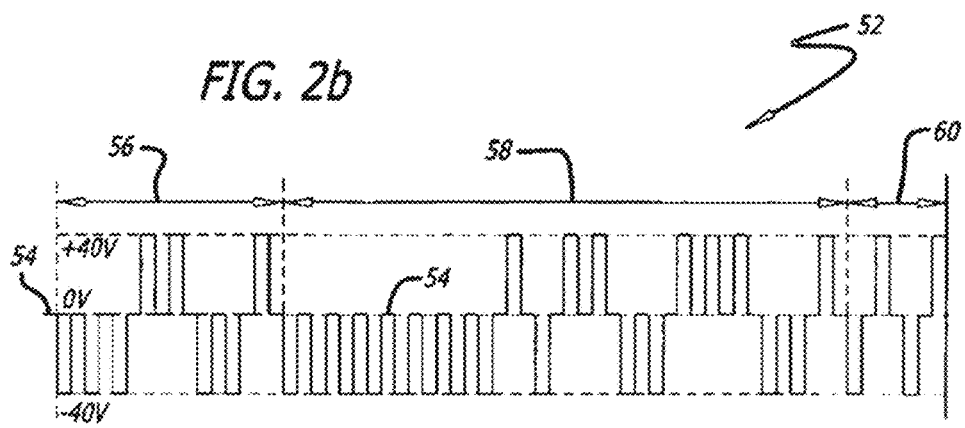
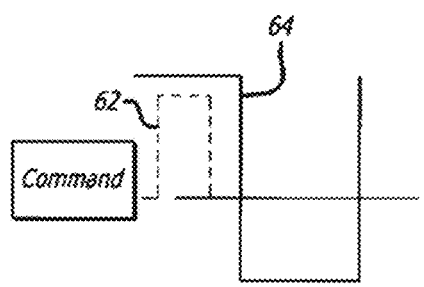
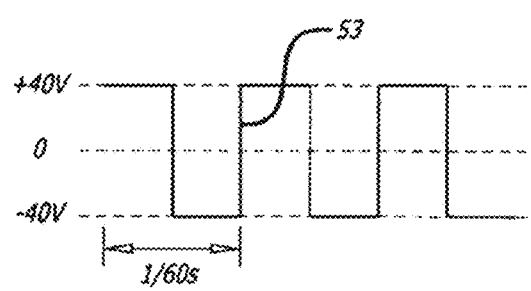
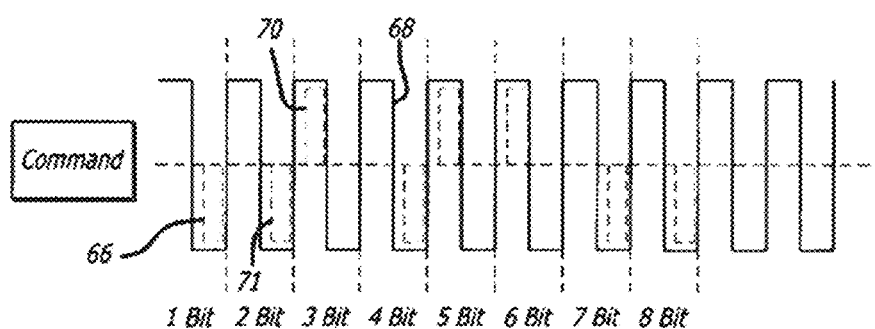

TWO-WIRE IRRIGATION COMMUNICATION SYSTEM

RELATED APPLICATIONS

This application claims priority to U.S. Provisional Application Ser. No. 62/245,823 filed Oct. 23, 2015 entitled Irrigation Solenoid and Decoder, which is hereby incorporated herein by reference in its entirety.

BACKGROUND OF THE INVENTION

Large commercial irrigation systems, such as those used on golf courses or croplands, use sprinklers, sensors or other components that are normally powered from 24 V AC power lines that can be several miles long and can serve many hundreds of components. Various systems have been proposed for powering and controlling the components of such a system with just two wires. For example, U.S. Pat. No. 3,521,130 to Davis et al., U.S. Pat. No. 3,723,827 to Griswold et al., and U.S. Pat. No. 4,241,375 to Ruggles disclose systems in which sprinkler valves along a cable are turned on in sequence by momentarily interrupting the power or transmitting an advance signal from time to time.

A problem with this approach is that it does not allow the operator to freely turn on or off any selected sprinkler or set of sprinklers at different times. This problem is typically resolved by providing separate controllers in the field to operate groups of sprinklers in accordance with a program stored in them, or transmitted to them by radio or other means. Alternatively, it has been proposed, as for example in U.S. Pat. No. 3,578,245 to Brock, to operate individual sprinkler sets from a central location by superimposing a frequency-modulated signal or DC pulses onto the 24 V AC power line.

All of these approaches are expensive. For example, a system with hundreds of sprinklers requires miles of expensive, heavy wiring to accommodate the current drawn by a large number of valves that may be watering simultaneously. Also, heavy use of D.C. current may cause electrolysis issues with electrical components.

One alternative to these traditional irrigation systems are two-wire power and communications systems, such as the system shown in U.S. Pat. No. 7,358,626, the contents of which are incorporated by reference. In such systems, two wires supply both A.C. power and digital control communications from a controller to a plurality of decoders.

While these A.C. power and digital communication systems generally work well, they also have several disadvantages. First, decoder circuitry that listens for communications are sensitive to power surges by lightning. Hence, expensive, external surge devices with ground rods must be installed at short intervals along the power and communication wires.

Second, some two wire power and communication systems use bursts of current by valve or sensor decoders to acknowledge or otherwise communicate with a central controller. These decoders relied on fixed resistor circuits to switch to a circuit path with a resistor between the common current and ground on the decoder. Since these resistor circuits resist at a fixed value, any reduction in the voltage causes a proportional reduction in the current pulse (e.g., due to Ohm's Law). Therefore, if the current burst of the acknowledgement pulse is reduced sufficiently, the gateway 16 will not recognize it and therefore will falsely determine that the decoder did not receive a command. As decoders are installed further away from a gateway or central controller, the resistance of the power and communication wires becomes significant and reduces the voltage available across the decoder. Additionally, large numbers of decoders may also further reduce voltage and increase resistance on the power and communication wires. Hence, these systems effectively become limited in size and in the number of decoders.

SUMMARY OF THE INVENTION

One embodiment of the present invention is directed to a two-wire power and communication system for an irrigation system in which a gateway can transmit new firmware versions to decoders and/or other devices on the network.

Another embodiment of the present invention is directed to a decoder that can receive messages from a gateway with an irrigation start time and an irrigation run time.

Another embodiment of the present invention is directed to a communication protocol that can change its baud rate when data corruption occurs.

Another embodiment of the present invention is directed to a solenoid or decoder that can sense movement of the solenoid's plunger and relay that data back to the gateway.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which:

FIGS. 2a-2d illustrates a two-wire communication protocol.

DESCRIPTION OF EMBODIMENTS

Figure 1:
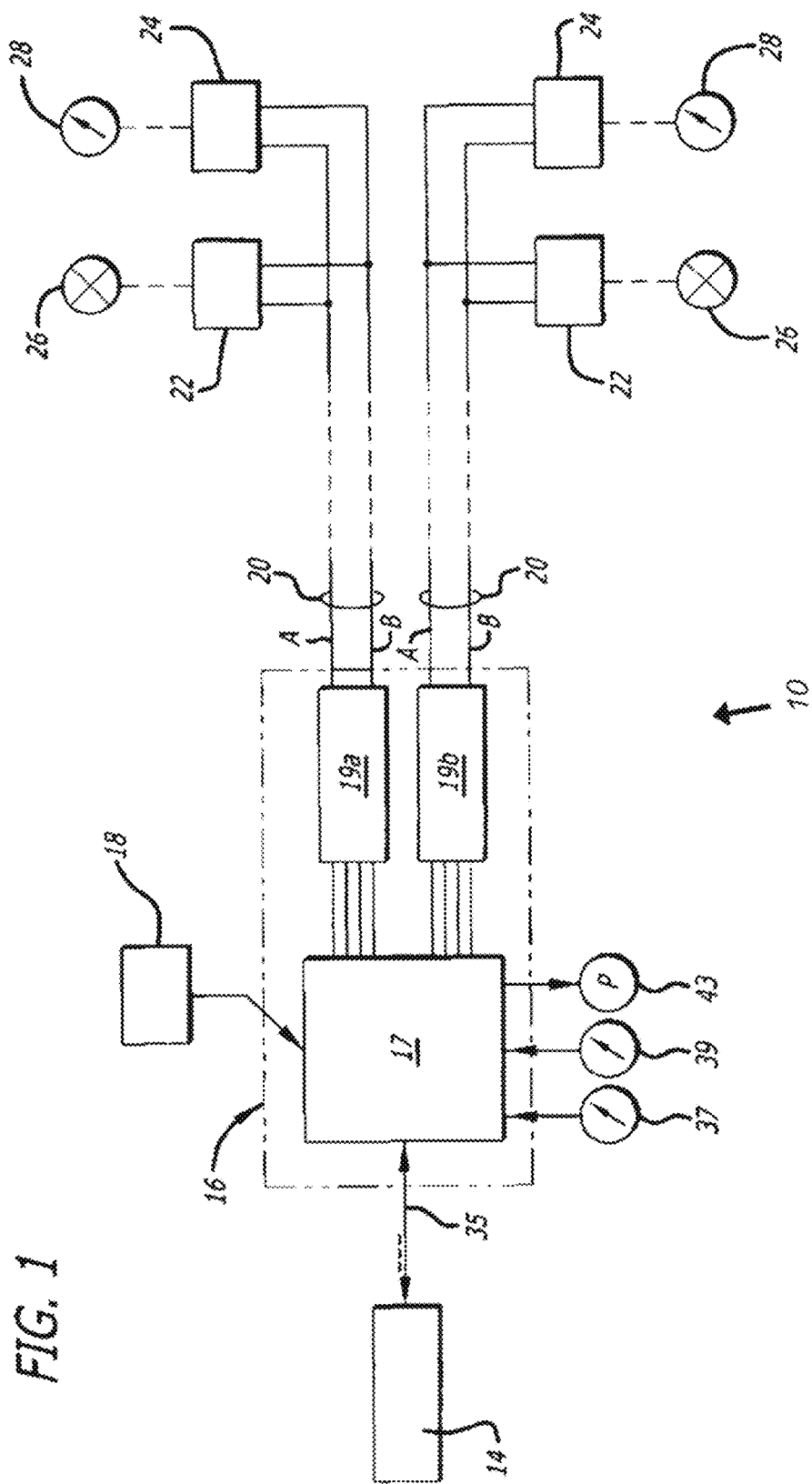
FIG. 1 illustrates a two-wire power and communication system for an irrigation system.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIG. 1 illustrates an overview of a two-wire power and communication system 10 according to the present invention. A controller 14, such as a PC or stand-alone irrigation controller, is used to program irrigation schedules and to monitor sensor data from the system 10.

A gateway 16 (i.e., a communication interface) is in communication with the controller 14 via communication connection 35 and transmits acknowledgments or other device information (e.g., from sensors 37, 39 and 43; watering station decoders 22; or sensor decoders 24) to the controller 14. Additionally, the gateway 16 transmits communication data such as commands (e.g., open or close a valve) to specific device decoders such as watering station decoders 22 and sensor decoders 24

In one example embodiment, the gateway 16 contains a motherboard 17 and a pair of daughterboards 19a and 19b that receive power from a power source 18. Each of the daughterboards 19a, 19b selectively applies potentials to wires A and B of their respective cables 20 (e.g., 1. +40 V on A with respect to B; 2. +40 V on B with respect to A; or 3. an equal potential on both A and B). The daughterboards 19a, 19b are also equipped to detect current drawn by the decoders of the system, and to report that information to the control unit 14 through the motherboard 17. Device decoders such as watering station decoders 22 and sensor decoders 24 are connected in parallel to the wires A and B, and are arranged to operate the system components (e.g. water valves 26 or sensors 28) connected to them.

Note that while wires A and B (i.e., a wire pair) are described as two, single wires, it should be understood that these wires can be made up of multiple wires connected together in series. In other words, wires A and B refer to two different conductive, electrical paths.

An example protocol for the operation of the system of this invention is illustrated in FIGS. 2a-d. In this example, the daughterboards 19a, b impress a square wave 53 alternating between +40 V (A positive with respect to B) and −40 V (B positive with respect to A) across their respective outputs A and B at a 60 Hz rate. This provides a square-wave power supply (FIG. 2a) to all the decoders 22, 24 along the cable 20. As pointed out below, the decoders 22, 24 can use power of either polarity. Because the time of the circuit at one polarity is generally equal to its time at the other polarity, electrolysis problems are minimized.

If it is now desired to actuate a specific sprinkler or sensor, the command pulse train 52 shown in FIG. 2b is transmitted. The command train begins with a no-power segment 54 in which the wires A and B are both grounded for 1/120 second. This is followed, in the preferred embodiment, by eight pulses 56 separated by similar no-power segments or delimiters 54. The pulses 56 may be either +40 V (signifying a "1") or −40 V (signifying a "0"). Taken together, the pulses 56 define the desired runtime (in minutes) of the device now to be selected.

The next twenty pulses 58, again separated by no-power delimiters 54, define the address of the desired device 26 or 28. Next, the nature of the desired command is specified by the four pulses 60. The command pulse train 52 illustrated in FIG. 2b may, for example, convey the command "Turn Station 3 of decoder 2873 on for 25 minutes". Upon completion of the command pulse train, the microprocessor returns control of the wires A and B to the power relays. The output of gateway 16 thus resumes the square-wave format of FIG. 2a.

If a selected decoder 22/24 has received and understood the command (see FIG. 2c), it sends an acknowledgment signal by momentarily drawing a high current burst 62 during the +40 V portion of the first square wave 64 following the command pulse train. This is detected by a current sensor of the gateway 16 and constitutes an acknowledgement that the decoder has received its instruction. If no current is detected during the first square wave 64, a control failure is indicated, and the microprocessor may transmit an alarm to the control device 14.

If the addressed device was a sensor decoder 28 (see FIG. 2d), the chosen decoder responds with current bursts 66 during the eight (in the preferred embodiment) square waves 68 following the command train. In each of these square waves, a current burst 70 during the +40 V portion transmits a "1" to the gateway 16, while a current burst 71 during the −40 V portion transmits a "0". As in the case of a station decoder 22/24, the lack of any current burst during a square wave 68 indicates a system failure and may trigger an alarm. Additional operational details of this system can generally be found in U.S. Pat. Nos. 7,358,626 and 8,796,879, the contents of which are incorporated by reference.

Figure 3A:
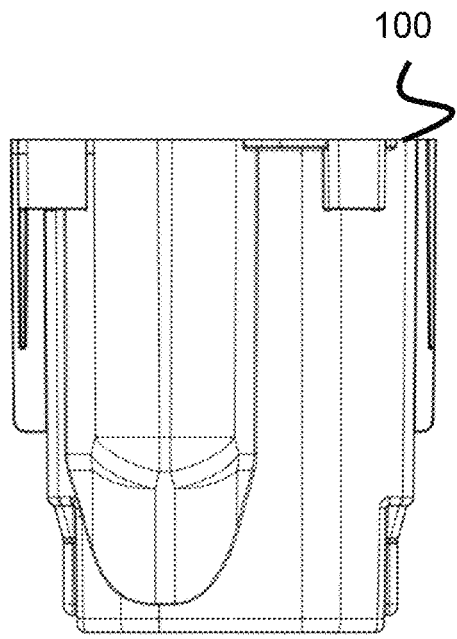
FIGS. 3A-3C illustrates various aspects of a decoder for a two-wire communication system.
Figure 3B:
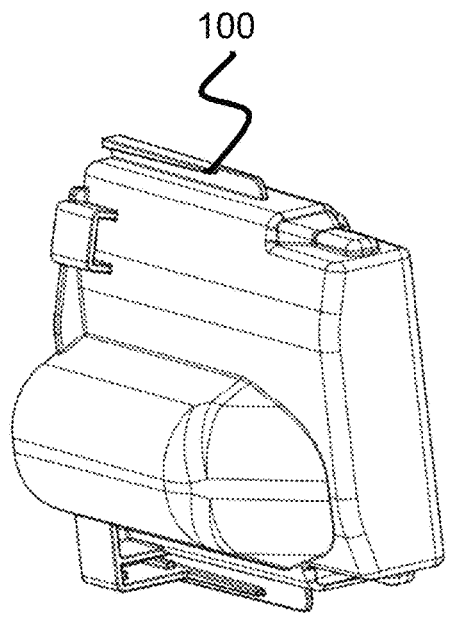
Figure 3C:
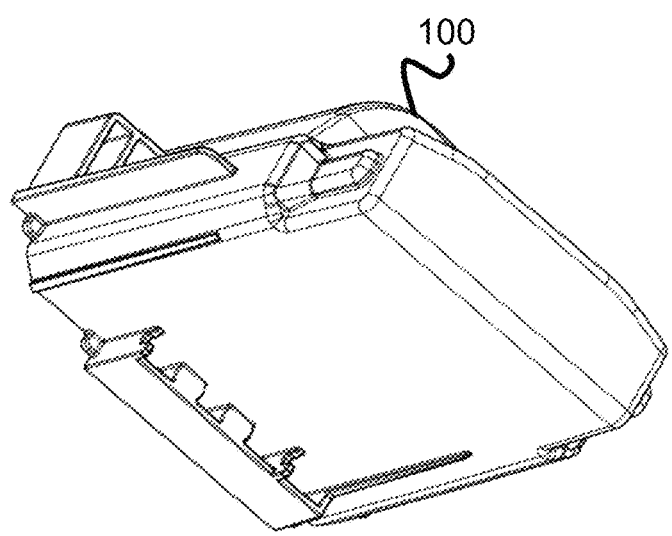
Figure 4:
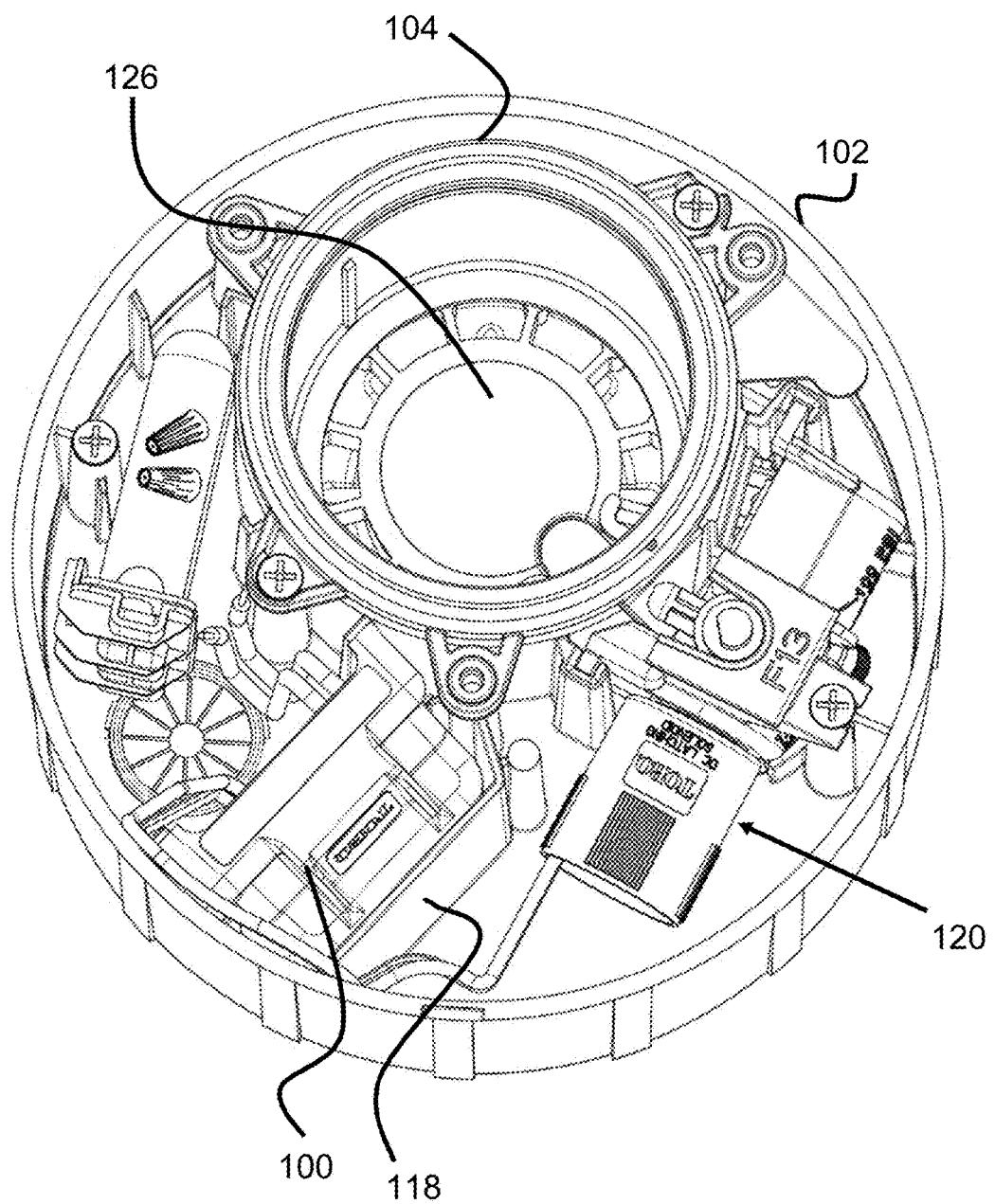
FIG. 4 illustrates a top view of a top serviceable sprinkler containing a decoder and a solenoid.

FIGS. 3A-3C illustrate another embodiment of a decoder 100, similar to the previously described decoder 22/24 that connects to a two-wire power and communication system 10. While the decoder 100 can be connected to a valve that supplies multiple irrigation sprinklers, the decoder can also be located within and control a single sprinkler. For example, FIG. 4 illustrates a top view of a top serviceable sprinkler with a removable top. A compartment within the sprinkler is formed by the outer wall 102 and the inner wall 104, and this compartment can be further divided with walls 118. In this top serviceable sprinkler, the decoder 100 is connected to solenoid 120, which controls a lower valve 126 within the sprinkler, thereby causing the sprinkler to selectively irrigate. Additional details of such a top serviceable sprinkler can be found in U.S. application Ser. Nos. 11/303,328 and 14/280,113, the contents of which are incorporated herein by reference.

Figure 5:
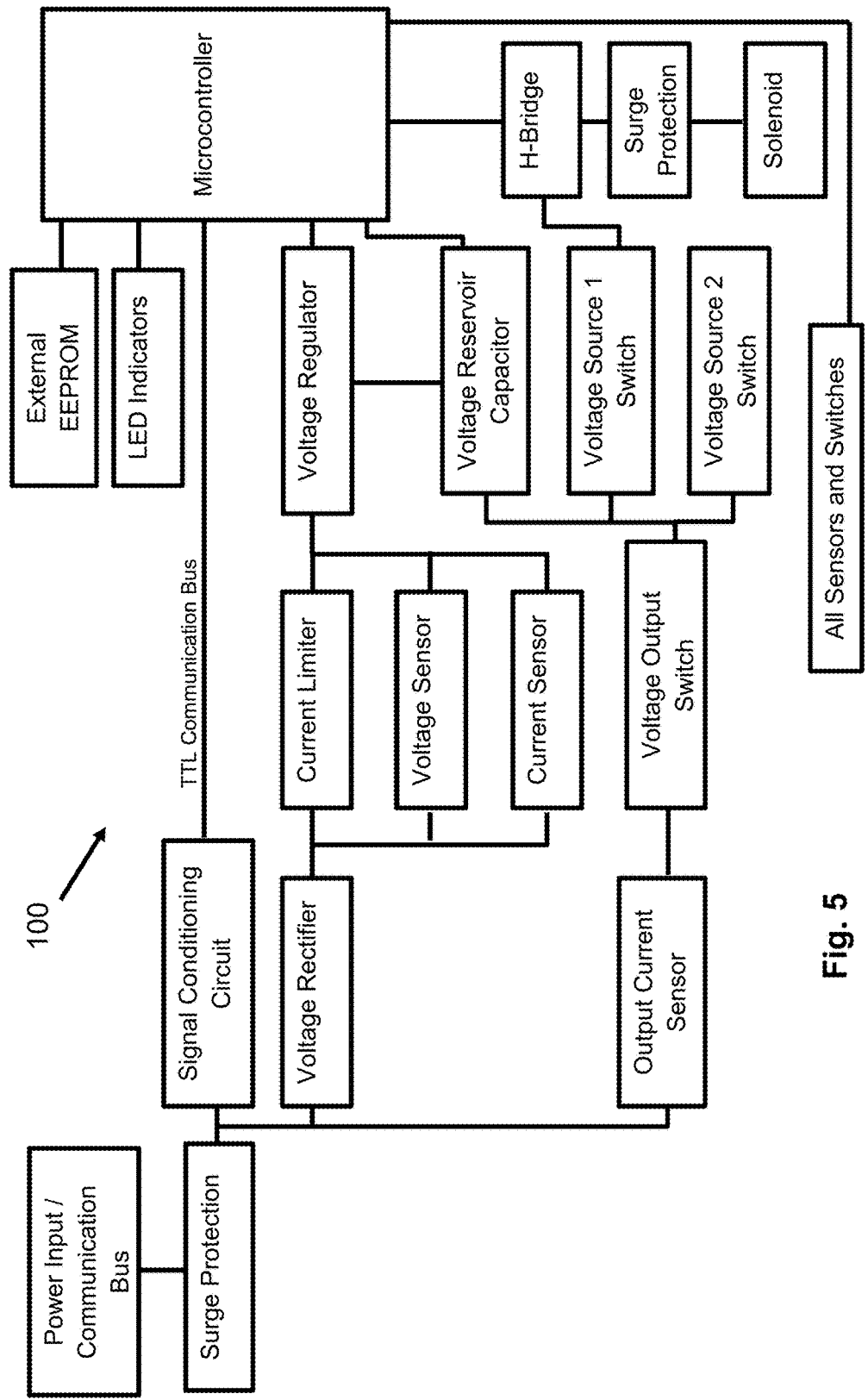
FIG. 5 illustrates a plan view of circuitry of a decoder.

FIG. 5 illustrates one example of the electronic components that may be included in the decoder 100. Generally, the power input and communication bus connects to the two-wire power and communication cables 20 to allow the microcontroller to communicate with the gateway 16. The microcontroller also connects to and controls the solenoid 120.

Figure 6:
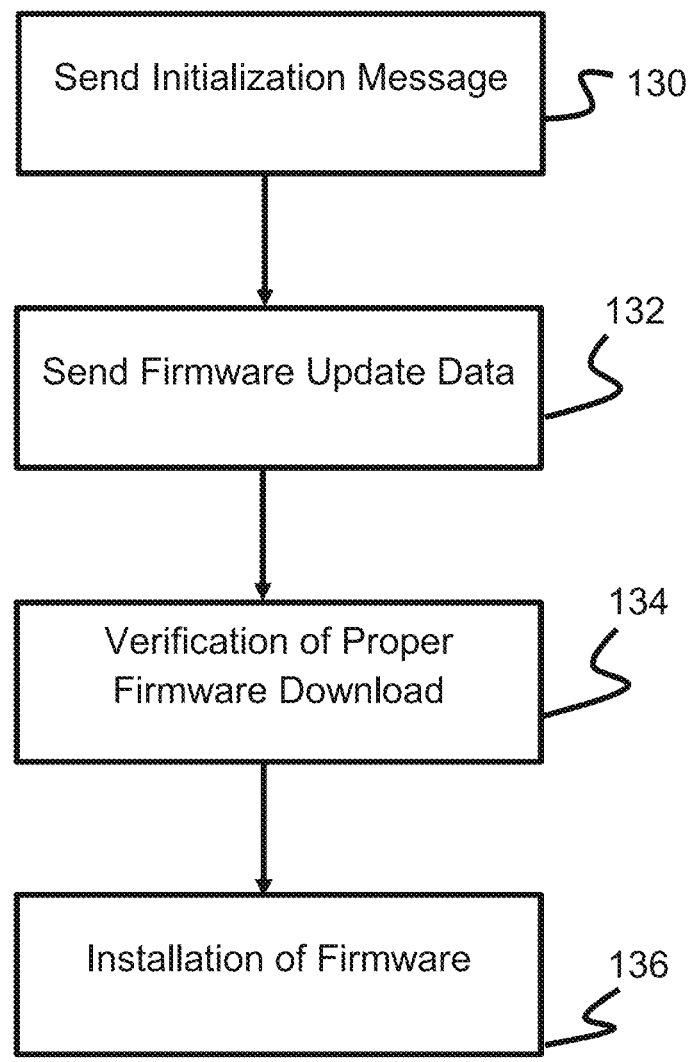
FIG. 6 illustrates a flow chart for a method of updating firmware of a decoder remotely.

In one embodiment shown in FIG. 6, the decoder 100 and gateway 16 can allow for new firmware to be transmitted over the two-wires 20 to one or more decoders, allowing the decoders 100 to be updated with new firmware as needed. Typically, decoders are designed to operate underground and therefore are encapsulated in durable, sealed housings to protect and isolate their sensitive electronic circuitry from external conditions, such as water and dirt. Hence, by allowing the gateway 16 (or another connected device) to send firmware data remotely to each decoder 100, the decoders 100 can be improved (e.g., bug fixes, features additions, and similar improvements) with different firmware versions that would have been impossible or impractical to otherwise perform.

The microcontroller of the decoder, in one example, contains four separate memory banks. A first bank is the bootloader which serves as the application manager and determines which application is currently active. It also executes a series of diagnostic checks for integrity before jumping to the application. If any errors are detected in the active application, the bootloader attempts to load the previous application that was active before it. If that also fails, the bootloader restores the decoder to factory default and runs the default application in the second bank.

The second bank contains the factory default or original firmware. This area of memory is preferably read-only.

The third bank is an available memory area reserved for firmware downloads and updates. If this bank is currently active, the fourth bank is preferably used for storing the firmware updates.

The fourth bank is an alternative area of memory reserved for firmware updates. If the third bank is active, this bank is instead used.

As noted with item 130, the firmware update process begins with the gateway 16 (or other device capable of transmitting updated firmware) sending an initialization message to an individual decoder 100 (or optionally several decoders). The initialization message preferably contains parameters that describe the upcoming firmware data (e.g., size and hash data), instruction on how to manage it (e.g., where to store the firmware and how it should be performed, and an address signature that specifies which decoder(s) should receive and update the firmware (all others are ignored).

In one specific example, the initialization message includes a memory bank number of where the firmware update will reside, a bit-mapped image of memory sections expected to download (the selected memory bank is divided into discrete sections that are each represented as a single bit of an array of 8-bit bytes and since not all sections of memory need to be downloaded, it serves as a download status check to completion), a download address signature (a unique address to identify if an incoming message contains firmware update data), a firmware revision number, and a firmware CRC (or a hash signature which is calculated by the gateway 12 and stored by the decoder 100, allowing the decoder to perform its own calculations to determine if any changes or corruption to the firmware data has occurred).

In item 132, the firmware update data is transmitted from the gateway 16 to the decoder(s) 100. Preferably, the data is divided into smaller blocks or messages addressed to the previously initialized decoder(s) 100. In this regard, only decoders 100 that were previously initialized and assigned an address signature accept the firmware data, while all other decoders 100 ignore the data.

Next in item 134, the downloaded firmware update data is verified. The decoder(s) 100 perform diagnostics and note various statistical data on the firmware (e.g., data size and/or any hash signatures). The gateway 16 then interrogates individual decoders 100 with update address signatures by requesting the diagnostic and statistical data. Preferably, the updated firmware data is stored in an area of memory that is separate from the original firmware, such that if errors in the downloaded data are determined by the gateway 16 or decoders 100, the updated firmware can be resent and the prior verification procedures are repeated.

Finally, in item 136, after no errors have been determined or reported, the gateway 16 sends a command to the decoder(s) to execute the firmware update. This update may include rebooting the system to a firmware update mode that copies the updated firmware over the prior version in memory.

Currently, prior art decoders only accept immediate start and stop commands with regard to irrigation events. This allows a central controller connected to a gateway 16 to maintain an irrigation schedule and send start/stop commands to execute it accordingly. However, since each decoder 100 must be addressed individually, such prior art systems can only turn on/off one decoder at a time. In this respect, it can take some time for sprinklers in particularly large irrigation systems (e.g., parks or golf courses) to all turn on or off.

Figure 7:
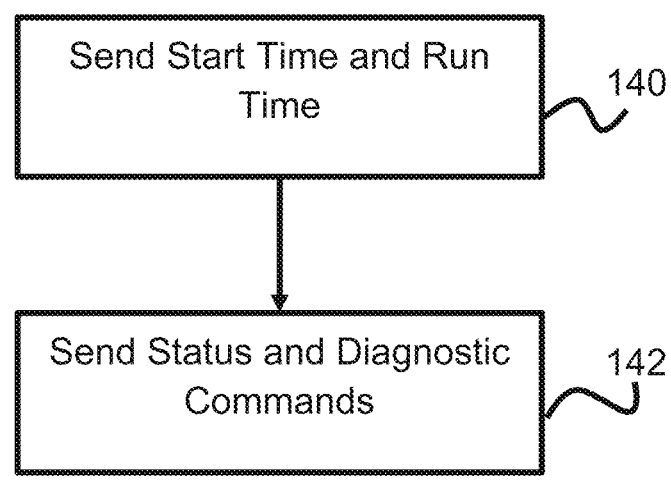
FIG. 7 illustrates a flow chart for a method of sending decoder commands with a start time and a run time.

FIG. 7 illustrates another aspect of the decoder 100 in which multiple decoders can be activated at once, as well as other benefits, by receiving an irrigation command scheduled for a later time. In one embodiment, the gateway 16 can send out a start time and a run time addressed to an individual decoder 100, allowing the decoder 100 to turn on the solenoid at a later time for a predetermined period of time.

Specifically, in item 140, the central controller causes the gateway 16 to generate a message to an individual decoder 100 that contains a start time and a solenoid or sprinkler run time. Preferably, the start time is a length of time from receiving the command, such as 10 minutes, from which the decoder 100 will count down from. Alternately, the start time can be a length of time after then next decoder power up (this can be used in systems operating in a "switched mode" in which power to the decoders is turned off if no irrigation is being performed). After the start time expires, the decoder 100 activates its attached solenoid. In another alternate embodiment, the decoder 100 can maintain a clock that is periodically synced by the gateway, and the irrigation start time is sent out as a time of day.

The gateway 16 can further adjust the start times for several decoders such that they all start at the same time. For example, the gateway 16 can account for the amount of time it takes to communicate with each subsequent decoder 100 and reduce the start time by that amount, thereby allowing all decoders addressed to start at nearly the exact same time, limited only by the capacity of the gateway power supply instead of the bandwidth of the communication system.

The solenoid run time is also a length of time that the decoder 100 counts down from after activating the solenoid, then deactivates the solenoid after the runtime expires. Since the solenoid controls the irrigation valve near or in the sprinkler, it results in irrigation during this time.

As noted in item 142, at any time prior to, during, or after irrigation, the gateway can send a diagnostic message to one or more decoders 100 to determine if the solenoid is on, off, and/or has run for the appropriate time (as well as other errors, such as an open or short circuit). This status and diagnostic information can then be relayed from that gateway 16 to the central irrigation controller.

In another aspect of the aforementioned start/runtime message, a broadcast message can also be sent to initiate watering via multiple decoders 100 simultaneously. In this respect, each decoder (or irrigation station in cases where multiple sprinklers are connected to a single decoder), can be assigned a watering group identifier (e.g., a number), allowing a start/runtime broadcast message to be sent out for all decoders with a specific identifier. The gateway 16 can perform diagnostics/analysis as discussed above for each of the decoders 100 of a watering group identifier to confirm they received their instructions and executed them accordingly.

If a watering group is relatively large, the execution of the watering commands can include functionality to stagger start times. For example, the decoders 100 can be programmed to start irrigation from such a broadcast message based on a portion of their address on the network (e.g., last two digits of their address), serial number, or other techniques (random staggering times). This staggering functionality may prevent simultaneous start times from creating too much load on the wires of the network.

Again using a start/runtime message allows for several advantageous functions. First, many solenoids can be activated without real time messages from the gateway 16. Additionally, many solenoids can be activated concurrently, limited only by the power supply of the gateway 16 instead of the communication bandwidth of the gateway 16. Finally, while a watering cycle is running, the gateway 16 is free to interrogate decoders 100 to get status updates.

Figure 8A:
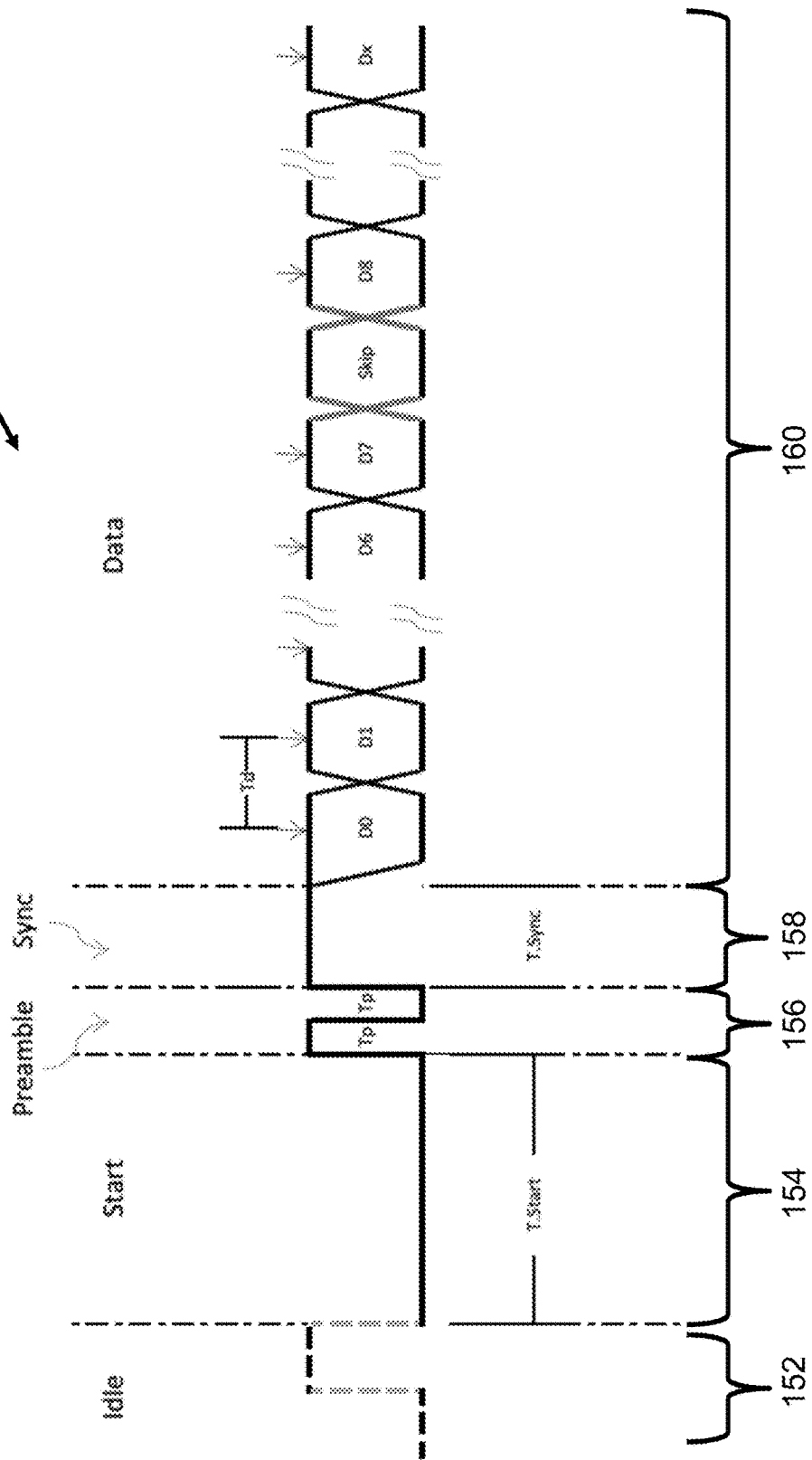
FIGS. 8A-8B illustrate a communication protocol for a two-wire power and communication system that allows the baud rate to be adjusted.
Figure 8B:
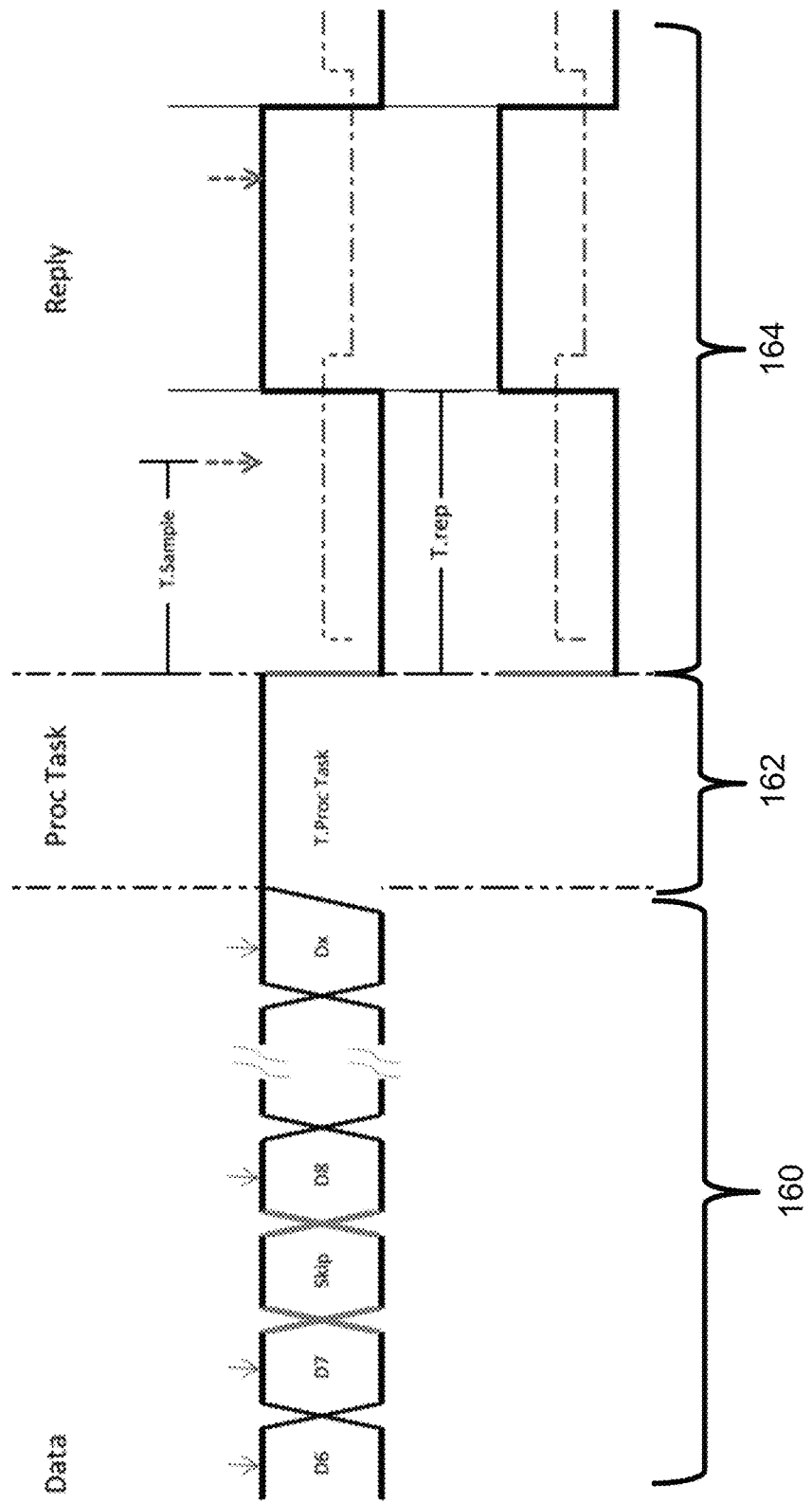

FIGS. 8A and 8B illustrate an aspect of a communication protocol between a gateway 16 and a decoder 100 that allows for the baud rate of the communications to be adjusted to improve reliability. Wired long-distance communication is often unreliable at high data rates, primarily due to parasitic capacitive and resistive components inherent in long lengths of wire. In this respect, the communication wire creates a resistor-capacitor circuit that can distort the signal in conditions, thereby corrupting data.

The probability of corruption increases with higher data rates and therefore lowering the data rate can increase reliability of a communication protocol for a two-wire system. However, this property is heavily dependent on configuration and environmental conditions where higher data rates can be used in ideal conditions, and lower data rates are required in less than ideal conditions. A variable baud rate communication mechanism can be used to test and calibrate an optimal baud rate to adapt to varying conditions in order to maximize communication efficiently.

The communication protocol 150 of the present invention is a single-master, multiple-slave simplex communication protocol over the previously described two-wire bus that can vary the baud rate as needed. In the idle mode, or when no communication occurs, the gateway 16 generates a square wave AC voltage that cycles at a time of T(idle), as seen in the idle portion 152 of the protocol. Next, a single, continuous square wave is generated to signify a start of data transmission in start portion 154. Next, in the preamble portion 156, a series of pulses N (pulses) are generated by the gateway 16. The decoder 100 measures the pulse width T (pulse) of each pulse and then calculates an average pulse time T(average), which then is used by the decoder as the baud rate. The averaging of the pulse time helps to ensure accuracy of the determination of the baud rate. The average pulse time is used in a mathematical formula in common between the gateway 16 and decoder 100 for determination of the final baud rate. The N (pulses) are preferably sent back to the gateway 16 from the decoder 100 to confirm that the baud rate was properly received by the decoder 100.

In the subsequent sync portion 158, a delay occurs for a predetermined time T(pulse delay) which is known by the gateway 16 and decoder 100. This can be a fixed time parameter or can be variable using a common formula between both devices. The data portion 160 follows, in which data is transmitted at the baud rate determined by the gateway 16 in a manner discussed earlier in this specification. The following proc task portion 162 is a predetermined period of time known by both the gateway 16 and decoder 100 to allow a decoder 100 to execute a task. This amount of time can be further dependent on the type of task being performed or message type. The signal is held at a constant state during this period to minimize noise caused by switching a signal's state. Finally, in the reply portion 164, the decoder 100 communicates contextual data back to the gateway 16 via a series of pulses. Both the pulses for the data portion 160 and reply portion 164 have a length that represents a data bit and that is a function of the average pulse time, thereby communicating at a specified baud rate.

If data corruption is detected by either the gateway 16 or the decoder 100, the gateway 16 may resend the message at a lower baud rate. This routine is repeated until successful communication is achieved, or when the maximum number of retries is exceeded.

Figure 9:
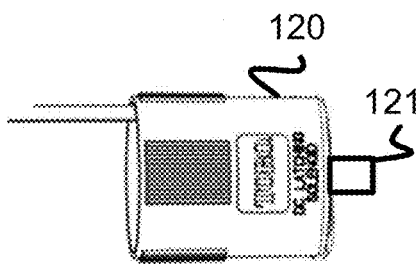
FIG. 9 illustrates a solenoid having circuitry that can sense movement of a plunger of the solenoid.
Figure 10:
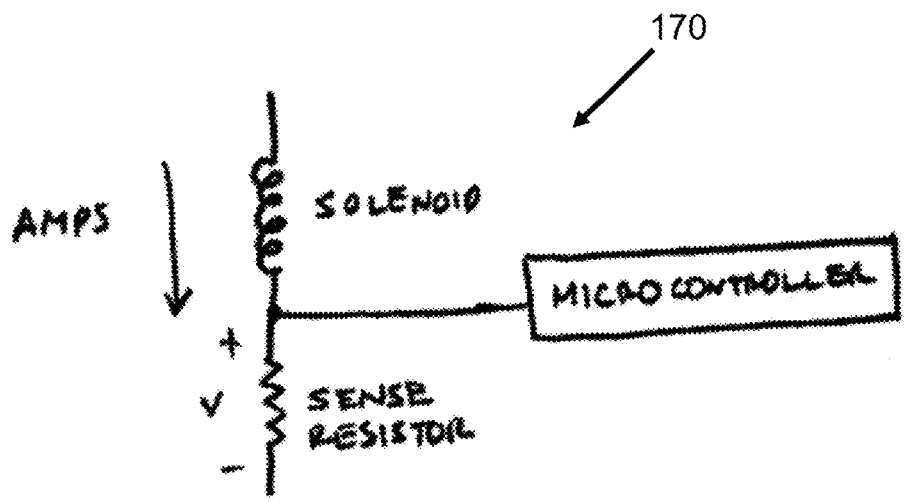
FIG. 10 illustrates circuitry that can sense movement of a plunger of the solenoid.

FIG. 9 illustrates a solenoid 120 having a plunger 121 that is controlled by a decoder 100 and used to open an irrigation valve that is either connected to a sprinkler or within the sprinkler itself. FIG. 10 illustrates a simplified circuit diagram of a circuit 170 for sensing movement of the plunger 121 and thereby confirming that a solenoid functioned as intended (i.e., turning the valve on or off).

The present circuit 170 allows detection of the plunger's position without the need to have specialized sensors within or on the solenoid 120. More specifically, as seen in FIG. 10, the circuit 170 includes a microcontroller that can sense the current draw of the solenoid 120 by allowing the current to flow through a sense resistor. The current flowing through the resistor induces a voltage that is fed into the microcontroller's analog-to-digital converter for analysis by the software.

Figure 11:
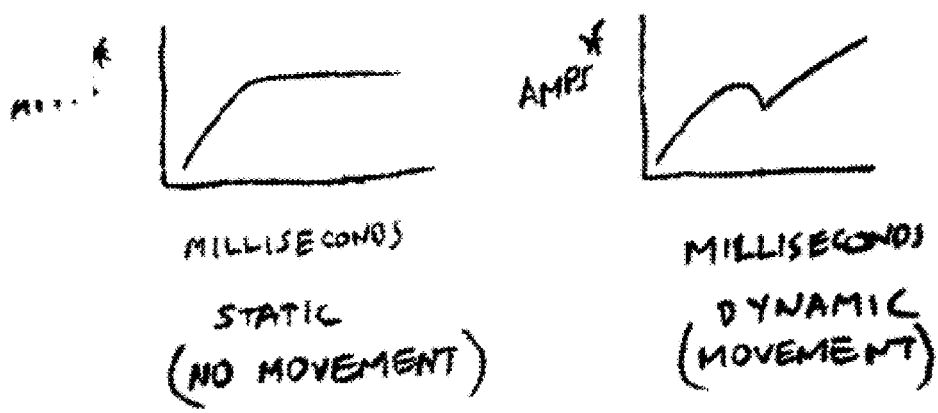
FIG. 11 illustrates graphs showing changes in amps when the solenoid plunger is stationary or moving.

As seen in FIG. 11, the technique of detecting movement of a solenoid's plunger involves characterizing the electrical response of the solenoid 120, which is essentially an inductive load (the solenoid's body), with a metallic core of the plunger 121. As the plunger 121 moves, the solenoid's electrical properties (e.g., amps) change over time and therefore produce a dynamic electrical response. When the plungers 121 is stationary, a static response is produced. In this regard, the microcontroller can determine the movement of the plunger 170 and thereby predict if the valve is operating as intended.

In one embodiment, this circuit 170 can be located within the solenoid 120 and can further communicate with the decoder 100, allowing the decoder to relay the status of the plunger 121 back to the gateway 16 and master controller. In another embodiment, this circuit 170 (i.e., the sense resistor and microcontroller) can be located in the decoder 100, which can similarly transmit the status of the plunger 121 back to the gateway 16.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A power and communication system for an irrigation system, comprising:
   a gateway device connected to a two-wire conductive path for supplying power and communication; said gateway device selectively adjusting power characteristics on said two-wire conductive path to create a message, said message containing a decoder address and an irrigation time value; and,
   a decoder device connected to said two-wire conductive path and further connected to a solenoid configured to open and close an irrigation valve; said decoder device measuring said power characteristics to receive and decode said message; said decoder device activating said solenoid at a predetermined time specified in said irrigation time value, such that said solenoid causes said irrigation valve to open said irrigation valve at said predetermined time.

2. The power and communication system of claim 1, wherein said irrigation time value comprises an irrigation start time and an irrigation run time.

3. The power and communication system of claim 1, wherein said irrigation time value comprises an irrigation run time after the next power-on event of said decoder device.

4. The power and communication system of claim 1, wherein said irrigation time value comprises an irrigation start time.

5. The power and communication system of claim 1, further comprising a plurality of decoder devices, and wherein said gateway device is configured to transmit a plurality of messages that each have the same time in said irrigation time value.

6. The power and communication system of claim 1, further comprising a plurality of decoder devices, and wherein said gateway device is configured to transmit a plurality of messages that each have different time in said irrigation time value.

7. The power and communication system of claim 1, further comprising a plurality of decoder devices that are each assigned a broadcast group identifier, and wherein said gateway device can transmit a broadcast message containing said broadcast group identifier.

8. The power and communication system of claim 7, wherein each of said plurality of decoder devices randomly stagger said irrigation time value.

9. The power and communication system of claim 1, wherein said gateway device further transmits via said two-wire conductive path an interrogation message that, when received by said decoder device, causes said decoder device to transmit a status message to said gateway device that indicates whether said solenoid is activated.

10. The power and communication system of claim 1, wherein said solenoid further comprises a plunger that moves upwards and downwards, and wherein said solenoid further comprises a circuit that senses movement of said plunger based on a change in electrical properties.

11. A power and communication system for an irrigation system, comprising:
a gateway device connected to a two-wire conductive path for supplying power and communication; said gateway device selectively adjusting power characteristics on said two-wire conductive path to create a message, said first message containing a preamble portion containing a data speed value that specifies a baud rate of communications over said two-wire conductive path; and,
a decoder device connected to said two-wire conductive path and further connected to a solenoid configured to open and close an irrigation valve; said decoder device measuring said power characteristics to receive and decode said first message; said decoder device determining said baud rate from said preamble portion, and said decoder device sending a second message at said baud rate.

12. The power and communication system of claim 11, wherein said data speed value comprises a first series of pulses generated on said two-wire conductive path.

13. The power and communication system of claim 12, wherein said decoder device measures a pulse width of each pulse from said first series of pulses of said data speed value.

14. The power and communication system of claim 13, wherein said second message further comprises a second series of pulses that each have the same pulse width of said first series of pulses.

15. The power and communication system of claim 11, wherein said solenoid further comprises a plunger that moves upwards and downwards, and wherein said solenoid further comprises a circuit that senses movement of said plunger based on a change in electrical properties.

16. A power and communication system for an irrigation system, comprising:
a gateway device connected to a two-wire conductive path for supplying power and communication; said gateway device selectively adjusting power characteristics on said two-wire conductive path to create a first message, said first message containing a decoder address and irrigation time data; and,
a decoder device connected to said two-wire conductive path and further connected to a solenoid configured to open and close an irrigation valve; said decoder device measuring said power characteristics to receive and decode said first message; said decoder device activating said solenoid at a predetermined time specified in said irrigation time data, such that said solenoid causes said irrigation valve to open said irrigation valve at said predetermined time.

* * * * *